J. F. DUKE.
NUT.
APPLICATION FILED NOV. 12, 1917.
1,313,075.
Patented Aug. 12, 1919.
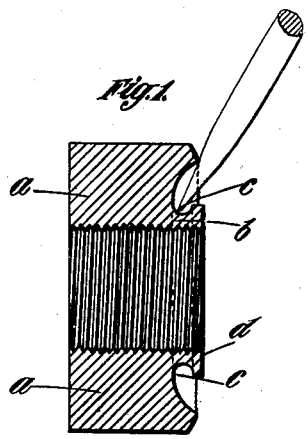
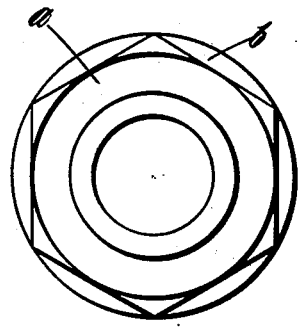
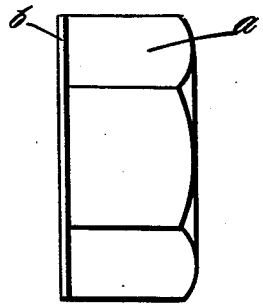
INVENTOR:
John Frederick Duke
By Attys.
Fraser, Duke & Myers

UNITED STATES PATENT OFFICE.

JOHN FREDERICK DUKE, OF SHORTLANDS, ENGLAND.

NUT.

1,313,075.   Specification of Letters Patent.   Patented Aug. 12, 1919.

Application filed November 12, 1917.   Serial No. 201,494.

*To all whom it may concern:*

Be it known that I, JOHN FREDERICK DUKE, a subject of the King of Great Britain and Ireland, of Shortlands, Kent, England, metallurgical chemist, have invented certain new and useful Improvements in or Relating to Nuts, of which the following is a specification.

This invention relates to nuts. The object of this invention is to provide a nut which can be readily locked so that it will not work loose by vibration or come undone inadvertently.

A nut made in accordance with this invention is provided with a flange which is adapted to be dented by a punch when screwed in position the dent being sufficiently deep to dent the thread on which it is screwed, or the work or the flange of another nut.

In the drawings:—

Figure 1 is a section of one form of nut made in accordance with this invention.

Fig. 2 is an elevation of a modified construction.

Fig. 3 is a side view of the construction shown in Fig. 2.

In the form shown in Fig. 1 the face $d$ of the nut $a$ is recessed at $c$ forming a flange $b$.

In use when it is desired to lock the nut in position the flange $b$ is dented with a punch so as to slightly dent the thread of the bolt. This is sufficient to prevent the nut from working loose by vibration or coming undone inadvertently.

In the form shown in Figs. 2 and 3 the flange $b$ is adapted to be dented by a punch or the like so as to dent the work against which it is screwed. Or when two nuts are placed on a bolt so that the flanges $b$ come back to back they may be locked together by a dent.

What I claim as my invention, and desire to secure by Letters Patent, is:—

A nut having a threaded opening, a base, side walls, a face, and provided with an annular recess in its face surrounding said threaded opening, said recess being curved initially toward said base, thence inwardly toward the threaded opening and thence outwardly toward the side wall, and forming a flange connected to the body of the nut by a relatively thin wall, the portion of said flange nearest the side walls being located beyond the portion of the recess nearest the threaded opening, thereby providing a curved pocket to receive and confine an indenting tool, the threaded opening being coextensive with said flange.

In witness whereof I have hereunto signed my name.

JOHN FREDERICK DUKE.